(12) United States Patent
Zhang et al.

(10) Patent No.: US 10,249,992 B2
(45) Date of Patent: Apr. 2, 2019

(54) ELECTRIC VEHICLE CHARGING HANDLE, LIGHT PIPE THEREFOR, AND ASSOCIATED LIGHT VISIBILITY ENHANCING METHOD

(71) Applicant: EATON CORPORATION, Cleveland, OH (US)

(72) Inventors: Xianzhen Zhang, Shanghai (CN); Lili Du, Shanghai (CN); Haidong Zhang, Shanghai (CN); Lin Yang, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 202 days.

(21) Appl. No.: 15/412,261

(22) Filed: Jan. 23, 2017

(65) Prior Publication Data

US 2018/0212373 A1      Jul. 26, 2018

(51) Int. Cl.
*H01R 13/717* (2006.01)
*B60L 11/18* (2006.01)
*F21V 7/00* (2006.01)
*F21V 7/22* (2018.01)

(52) U.S. Cl.
CPC ...... *H01R 13/7172* (2013.01); *B60L 11/1818* (2013.01); *F21V 7/0091* (2013.01); *F21V 7/22* (2013.01); *B60L 2230/12* (2013.01)

(58) Field of Classification Search
None
See application file for complete search history.

(56) References Cited

U.S. PATENT DOCUMENTS

| | | | |
|---|---|---|---|
| 6,225,776 | B1 | 5/2001 | Chai |
| 8,768,563 | B2 | 7/2014 | Nitzberg et al. |
| 9,071,074 | B2 | 6/2015 | Chen |
| 2011/0144823 | A1 | 6/2011 | Muller et al. |
| 2011/0172839 | A1 | 7/2011 | Brown et al. |
| 2013/0169226 | A1 | 7/2013 | Read |
| 2013/0201641 | A1 | 8/2013 | Soden et al. |

*Primary Examiner* — Elmito Breval
(74) *Attorney, Agent, or Firm* — Eckert Seamans

(57) ABSTRACT

A light pipe is for an EV charging handle. The EV charging handle includes a housing having a thru hole, and a light source coupled to the housing. The light pipe includes a body structured to be coupled to the light source in order to transmit light from the light source through the thru hole of the housing, the body having a first side portion having a first interior surface having a first surface roughness, and a second side portion extending from the first side portion, the second side portion having a second interior surface having a second surface roughness greater than the first surface roughness in order to increase a visibility range with which the light is transmitted through the thru hole of the housing.

15 Claims, 6 Drawing Sheets

Figure 1:
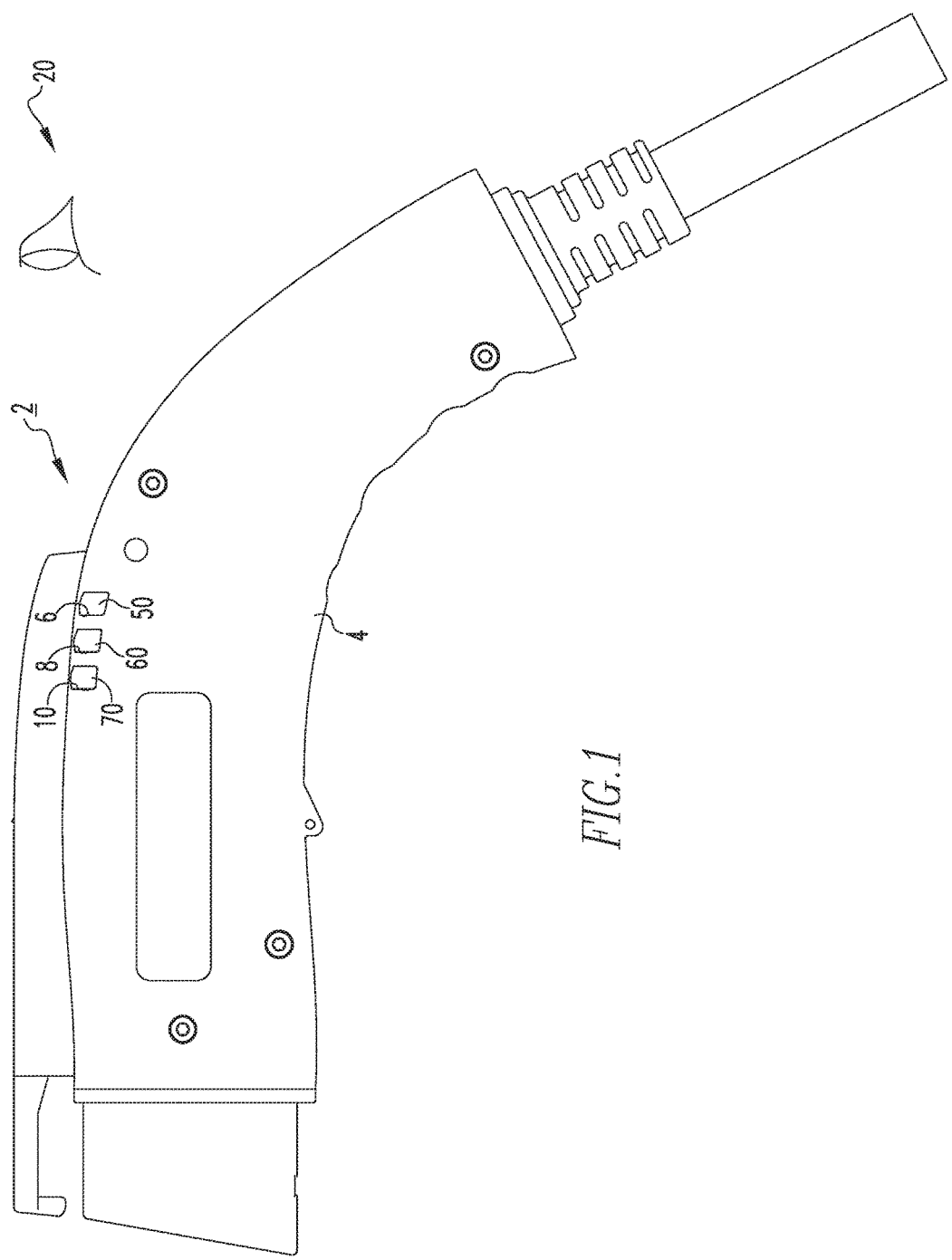

ELECTRIC VEHICLE CHARGING HANDLE, LIGHT PIPE THEREFOR, AND ASSOCIATED LIGHT VISIBILITY ENHANCING METHOD

BACKGROUND

Field

The disclosed concept pertains generally to electric vehicle (EV) charging handles. The disclosed concept also pertains to light pipes for EV charging handles. The disclosed concept further pertains to methods of enhancing light visibility.

Background Information

With the development of EV technology, the number of EVs is growing rapidly, and electric vehicle charging stations, similar to gas stations, have become popular. An EV charging station, also called an electric recharging point, charging point, and EVSE (Electric Vehicle Supply Equipment), is an element in an infrastructure that supplies electric energy for the recharging of electric vehicles, plug-in hybrid electric-gasoline vehicles, or semi-static and mobile electrical units such as exhibition stands. An EV charging station is a device that safely allows electricity to flow. EV charging stations generally contain a completely separate and unique box along with a connected EV charging handle.

Known EV charging handles include charging status indicator lights and light pipes coupled to the indicator lights. The light pipes transmit light from an interior of the charging handle to an exterior thereof in order to provide an indication to a user of the charging status. Known light pipes are limited in that the user can only see the emitted light within a relatively narrow visibility range.

There is, therefore, room for improvement in EV charging handles and in light pipes therefor.

There is also room for improvement in methods of enhancing light visibility.

SUMMARY

These needs and others are met by embodiments of the disclosed concept, which are directed to an improved EV charging handle, light pipe therefor, and associated light visibility enhancing method.

In accordance with one aspect of the disclosed concept, a light pipe is provided for an EV charging handle. The EV charging handle includes a housing having a thru hole, and a light source coupled to the housing. The light pipe includes a body structured to be coupled to the light source in order to transmit light from the light source through the thru hole of the housing, the body having a first side portion having a first interior surface having a first surface roughness, and a second side portion extending from the first side portion, the second side portion having a second interior surface having a second surface roughness greater than the first surface roughness in order to increase a visibility range with which the light is transmitted through the thru hole of the housing.

As another aspect of the disclosed concept, an EV charging handle including the aforementioned light pipe is provided.

As another aspect of the disclosed concept, a method of enhancing light visibility includes the steps of providing a housing having a thru hole; providing a light source coupled to the housing; providing a light pipe comprising a body coupled to the light source, the body comprising a first side portion having a first interior surface having a first surface roughness, and a second side portion extending from the first side portion, the second side portion having a second interior surface having a second surface roughness greater than the first surface roughness; energizing the light source in order to transmit light; reflecting the light off of the first interior surface; and reflecting the light off of the second interior surface in order to increase a visibility range with which the light is transmitted through the thru hole of the housing.

BRIEF DESCRIPTION OF THE DRAWINGS

A full understanding of the disclosed concept can be gained from the following description of the preferred embodiments when read in conjunction with the accompanying drawings in which:

FIG. 1 is a side elevation view of an EV charging handle and a portion of a light pipe therefor, in accordance with a non-limiting embodiment of the disclosed concept;

FIG. 2 is another side elevation view of the EV charging handle and light pipe therefor of FIG. 1, shown with a portion of the housing removed in order to see hidden structures;

FIG. 3 is a top plan view of the EV charging handle and light pipe therefor of FIG. 1;

FIG. 4 is a front view of the EV charging handle and light pipe therefor of FIG. 3;

FIG. 5 is a rear view of the EV charging handle and light pipe therefor of FIG. 4;

FIG. 6 is a front view of a light pipe for the EV charging handle of FIG. 5, shown with a light source and light rays in simplified form;

FIG. 7 is a left side elevation view of the light pipe of FIG. 6;

FIG. 8 is a right side elevation view of the light pipe of FIG. 6; and

FIG. 9 is a simplified exaggerated view of portion of an interior surface of the light pipe of FIG. 6.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

FIGS. 1-5 show an EV charging handle 2, in accordance with a non-limiting embodiment of the disclosed concept. The example EV charging handle 2 includes a housing 4, a printed circuit board 12 (shown in FIG. 2) coupled to and located internal with respect to the housing 4, a number of light sources (three of six example light emitting diodes 14,16,18 are shown in FIG. 2) electrically connected to the printed circuit board 12, and a corresponding number of novel light pipes 50,60,70,80,90,100 each having a body coupled to one of the light emitting diodes 14,16,18. Each of the light emitting diodes 14,16,18 is similarly cooperable with a corresponding one of the light pipes 50,60,70,80,90, 100, although only some of the light emitting diodes 14,16, 18 are explicitly shown and described herein.

The housing 4 has a number of edge portions (three of six edge portions 6,8,10 are indicated in FIG. 1) that each define a thru hole. The light pipes 50,60,70,80,90,100 transmit light from the light emitting diodes 14,16,18 through the thru holes defined by the edge portions 6,8,10 in order to provide an indication of charging status to a user. That is, a user can view which of the light pipes 50,60,70,80,90,100 are illuminated in order to determine the charging status (e.g., without limitation, a charging state, an off state, an error state, etc.). Furthermore, the light pipes 50,60,70,80,90,100 each generally extend from a corresponding one of the light emitting diodes 14,16,18 to a corresponding one of the edge portions 6,8,10 and are located internal with respect to the housing 4. As will be discussed in greater detail below, the light pipes 50,60,70,80,90,100 are advantageously structured so as to increase a visibility range (i.e., a visibility range 81 shown in FIGS. 5 and 6) with which light is transmitted through the thru holes defined by the edge portions 6,8,10.

Figure 6:
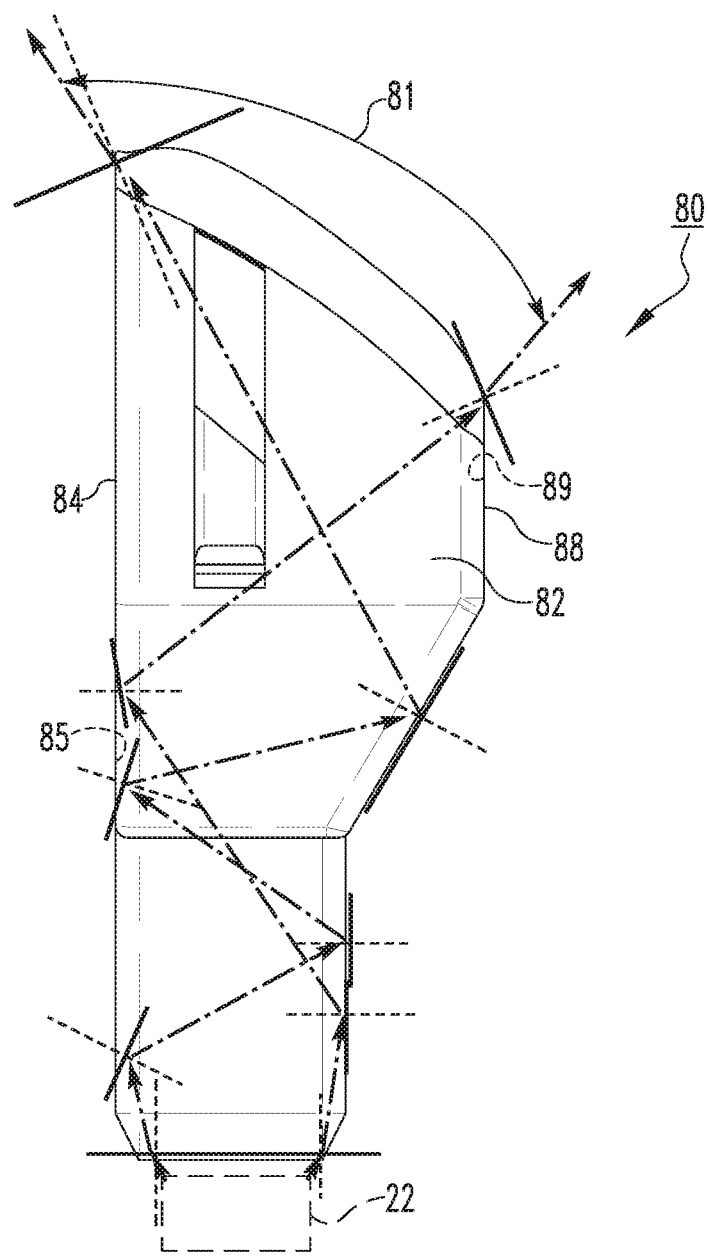
Figure 7:
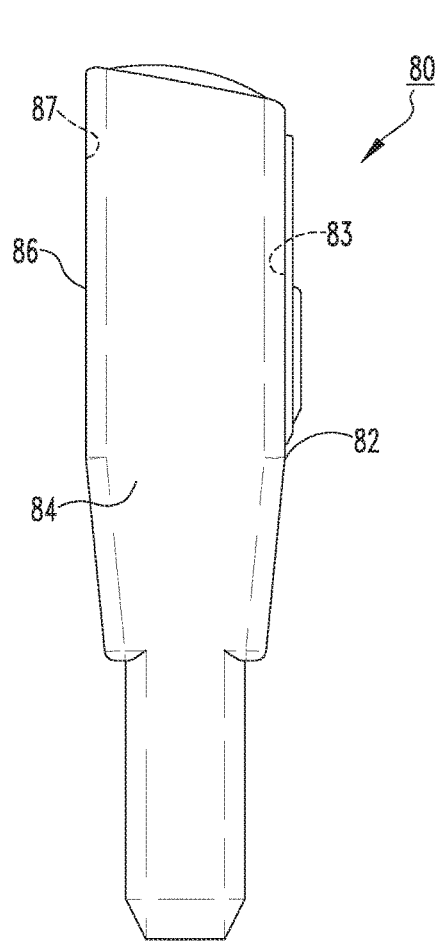
Figure 8:
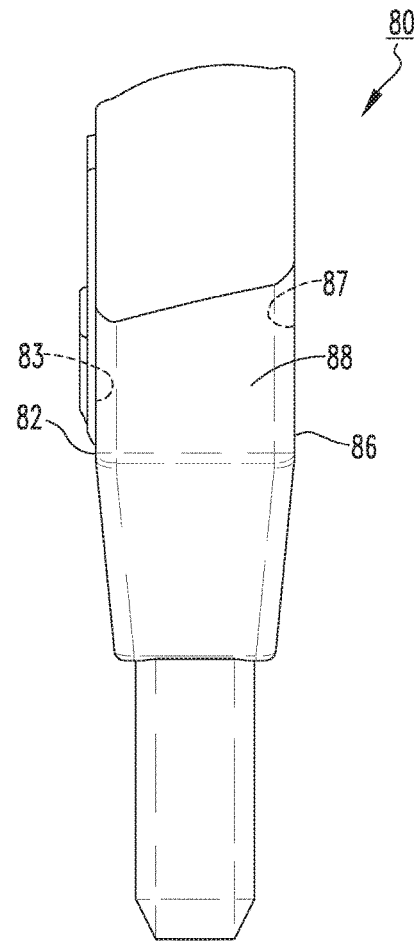

FIGS. 6-8 show different views of the light pipe 80. In one example embodiment, each of the light pipes 50,60,70,90, 100 is structured substantially the same as the light pipe 80. However, for ease of illustration and economy of disclosure, only the light pipe 80 will be discussed in greater detail herein. The body of the light pipe 80 is preferably a unitary component made from a single piece of material (e.g., without limitation, an injection molded component made from a suitable thermoplastic material). The body of the light pipe 80 includes a first side portion 82, a second side portion 84 extending from and being perpendicular to the first side portion 82, a third side portion 86 extending from and being perpendicular to the second side portion 84, and a fourth side portion 88 connecting the first side portion 82 to the third side portion 86. Although the disclosed concept is being described herein in association with side portions 82,84,86,88 perpendicular to each other, it will be appreciated that a similar suitable alternative light pipe (not shown) may have any suitable alternative geometry and/or orientation of side portions, without departing from the scope of the disclosed concept. The side portions 82,84,86,88 each have respective interior surfaces 83,85,87,89 for reflecting light. See, for example, light rays shown in phantom line drawing in FIG. 6, which are generated by an example light emitting diode 22 (shown in dashed line drawing) and which reflect off of the interior surfaces 83,85,87,89.

It will be appreciated with reference to FIG. 6 that the reflection of the light rays off of the interior surface 89 is specular reflection (i.e., mirror reflection) and the reflection of the light rays off of the interior surface 85 is diffuse reflection. In one example embodiment, the reflection of the light rays off of the interior surfaces 83,87 is also specular reflection (i.e., mirror reflection). Stated differently, light incident upon the interior surfaces 83,87,89 reflects at the same angle, whereas light incident upon the interior surface 85 reflects in a broad range of directions. In order to achieve this reflective attribute of the interior surface 85, a surface roughness of the interior surface 85 is greater than a surface roughness of the interior surfaces 83,87,89. In accordance with the disclosed concept, it has been discovered that by making the surface roughness of the interior surfaces 83,87, 89 $R_a$<0.8 micrometers and the surface roughness of the interior surface 85 $R_a$>0.8 micrometers, the reflection of light off of the interior surfaces 83,87,89 will be specular reflection, and the reflection of the light off of the interior surface will be diffuse reflection.

Figure 9:
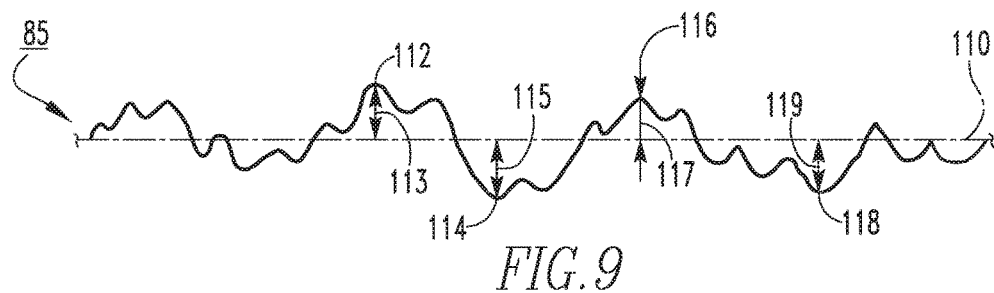

An enlarged, exaggerated and simplified view of the interior surface 85 is shown in FIG. 9. As shown, the interior surface 85 has a centrally disposed plane 110 and a plurality of peak portions (four example peak portions 112,114,116, 118 are indicated in FIG. 9) each spaced a distance 113,115, 117,119 from the centrally disposed plane 110. The average of the distances 113,115,117,119 of the peak portions 112, 114,116,118 from the centrally disposed plane 110 is greater than 0.8 micrometers (i.e., a relatively rough surface finish, as compared to the interior surfaces 83,87,89). It will be appreciated that an average of the distances of the peak portions of the respective interior surfaces 83,87,89 from respective centrally disposed planes is less than 0.8 micrometers (i.e., a relatively smooth surface finish as compared to the interior surface 85).

Figure 2:
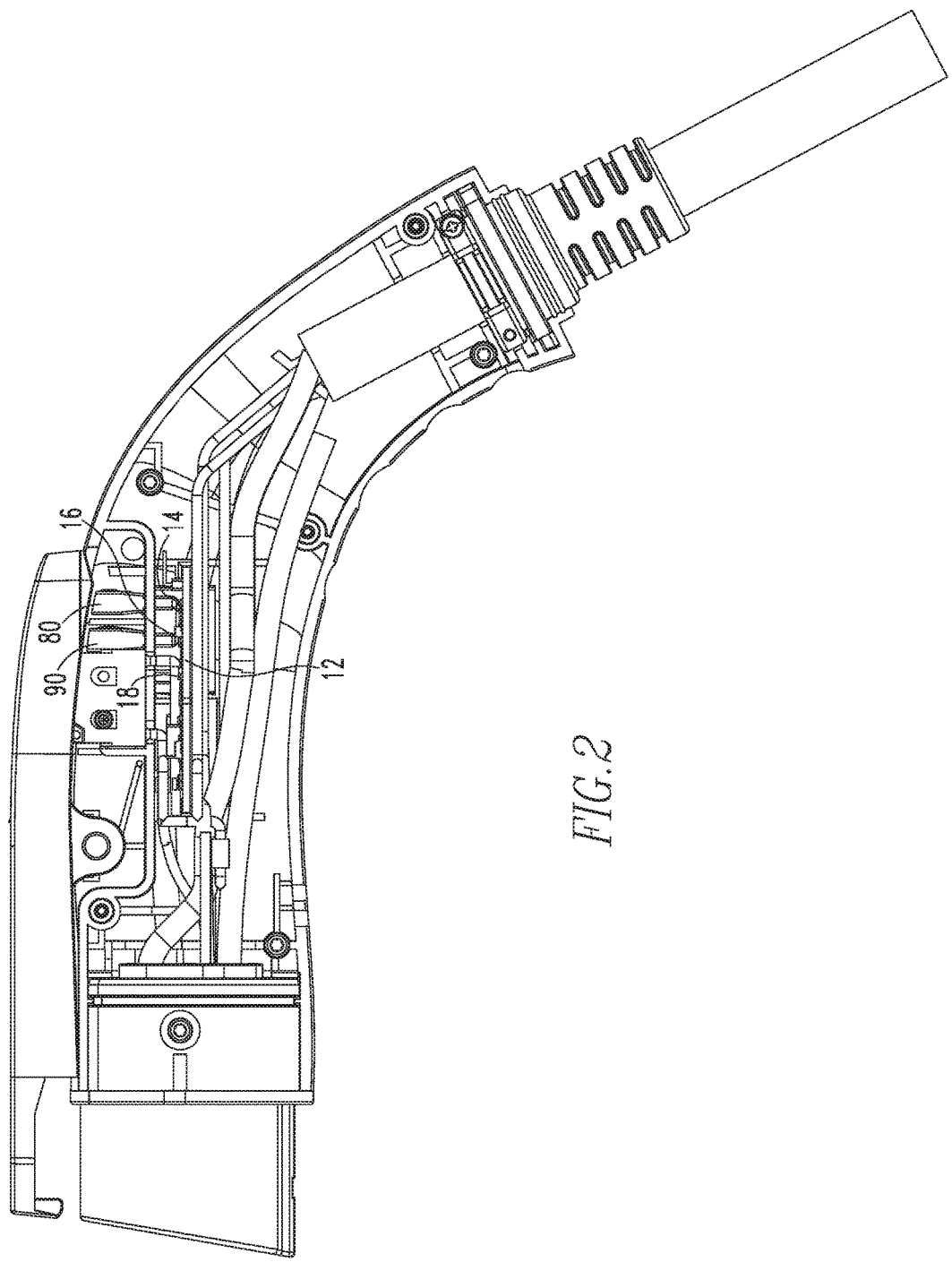
Figure 3:
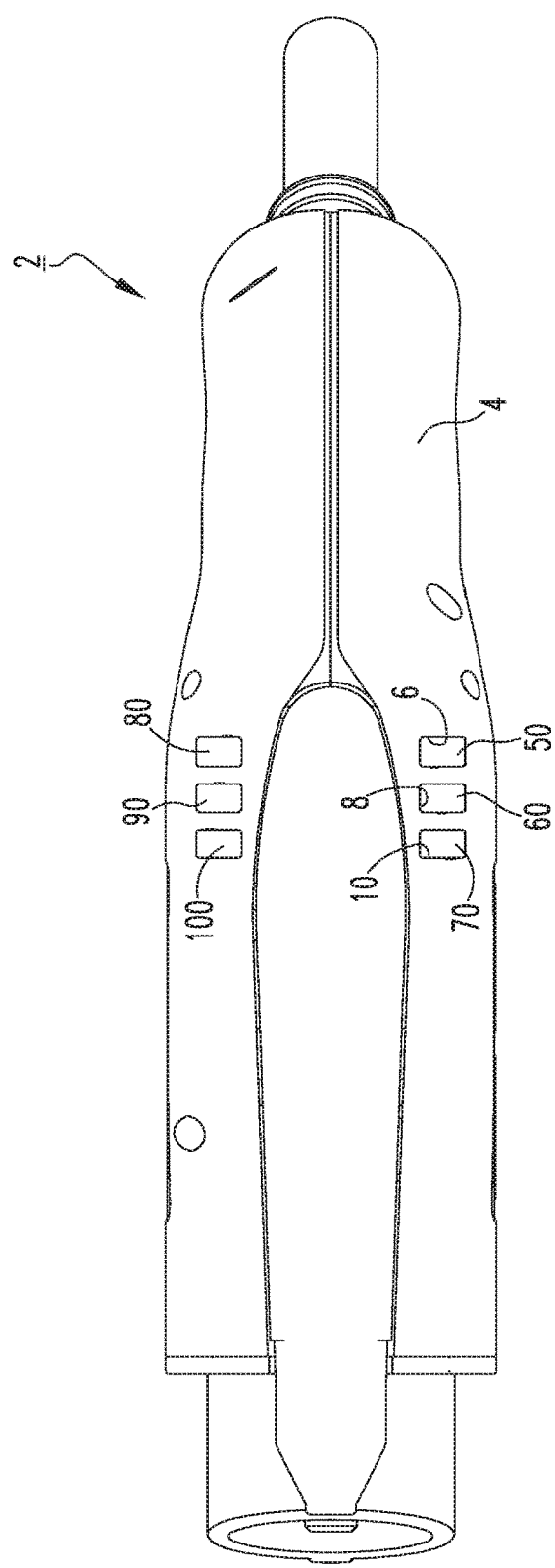
Figure 4:
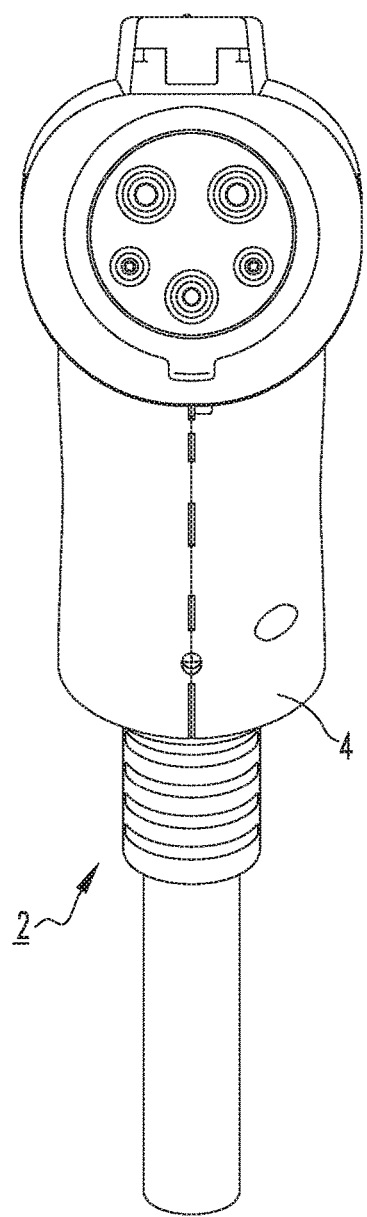
Figure 5:
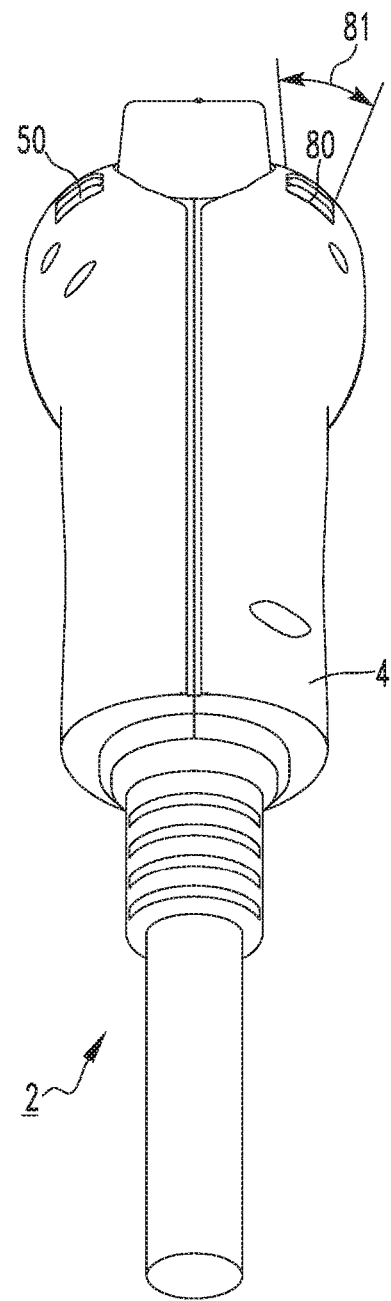

Referring again to FIGS. 5 and 6, the visibility range 81 with which light exits the housing 4 is relatively large, as compared with a prior art EV charging handle (not shown) in which all of the light pipes have interior surfaces with surface roughness of $R_a$<0.8 micrometers. Stated differently, the reflection of the light from the light emitting diodes off of all of the interior surfaces of the light pipes of prior art EV charging handles (not shown) is specular reflection, whereas the disclosed concept advantageously employs with the interior surface 85 a surface roughness of $R_a$>0.8 micrometers in order to provide for diffuse reflection, an attribute of the EV charging handle 2 which has been discovered to provide for the increased visibility range 81. That is, the surface roughness of the interior surface 85 is greater than the surface roughness of the interior surfaces 83,87,89 in order to increase the visibility range with which the light is transmitted through the thru holes defined by the edge portions 6,8,10 (FIG. 1). More specifically, the increased surface roughness of the interior surface 85 results in many light rays reflecting at larger and smaller angles off of the interior surface 85 (i.e., normal lines on the interior surface 85 will not be parallel to each other, resulting in greater and smaller angles of reflection for the reflected light rays). As such, light emitted by the light emitting diodes 14,16,18 (FIG. 2),22 (FIG. 6) is able to more easily be seen by a user. For example, a user positioned at a relative observation point external the housing 4 such as, for example and without limitation, the relative observation point generally indicated by reference 20 in FIG. 1, will see the light transmitted over the relatively large visibility range 81 (see FIG. 5, depicting the EV charging handle 20 as seen from the relative observation point 20 (FIG. 1)).

In the exemplary embodiment, the only interior surface of the light pipe 80 with a surface roughness of $R_a$>0.8 micrometers is the interior surface 85 because by employing with the interior surface 85 diffuse reflection, a portion of light reflecting off of the interior surface 85 will not be irradiated out of the light pipe 80 through the thru hole of the housing 4. However, it will be appreciated that in a suitable alternative light pipe (not shown), multiple surfaces may surface roughness of $R_a$>0.8 micrometers, without departing from the scope of the disclosed concept. Additionally, although the disclosed concept has been described herein in association with the light pipes 50,60,70,80,90,100 in the EV charging handle 2, similar suitable alternative light pipes (not shown) may be employed in other devices and/or assemblies besides the EV charging handle 2, without departing from the scope of the disclosed concept.

It will be appreciated that a method of enhancing light visibility includes the steps of providing the housing 4 having a thru hole, providing a light source 14,16,18,22 coupled to the housing 4, providing a light pipe 50,60,70, 80,90,100, energizing the light source 14,16,18,22 in order to transmit light, reflecting the light off of the interior surfaces 83,87,89, and reflecting the light off of the interior surface 85 in order to increase a visibility range 81 with which the light is transmitted through the thru hole of the housing 4. It will further be appreciated that the step of reflecting the light off of the interior surfaces 83,87,89 further includes specular reflection, and the step of reflecting the light off of the interior surface 85 further includes diffuse reflection.

Accordingly, it will be appreciated that the disclosed concept provides for an improved (e.g., without limitation, able to transmit light over a relatively large visibility range) EV charging handle 2, light pipe 50,60,70,80,90,100 therefor and associated light visibility enhancing method, in which an interior surface 85 of a light pipe has a greater surface roughness than other interior surfaces 83,87,89.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A light pipe for an EV charging handle, said EV charging handle comprising a housing having a thru hole, and a light source coupled to said housing, said light pipe comprising:
    a body structured to be coupled to said light source in order to transmit light from said light source through the thru hole of said housing, said body comprising:
        a first side portion having a first interior surface having a first surface roughness, and
        a second side portion extending from said first side portion, said second side portion having a second interior surface having a second surface roughness greater than the first surface roughness in order to increase a visibility range with which the light is transmitted through the thru hole of said housing.

2. The light pipe of claim 1 wherein a reflection of the light off of the first interior surface is specular reflection; and wherein a reflection of the light off of the second interior surface is diffuse reflection.

3. The light pipe of claim 2 wherein the first interior surface and the second interior surface each have a centrally disposed plane and a plurality of peak portions each spaced a distance from the centrally disposed plane; wherein the average of the distances of the peak portions from the centrally disposed plane of the first interior surface is less than 0.8 micrometers; and wherein the average of the distances of the peak portions from the centrally disposed plane of the second interior surface is greater than 0.8 micrometers.

4. The light pipe of claim 1 wherein the second surface roughness is greater than the first surface roughness in order to increase the visibility range with which the light is transmitted through the thru hole of said housing when the light is viewed from a relative observation point external said housing.

5. The light pipe of claim 1 wherein the second side portion is disposed generally perpendicular to the first side portion.

6. The light pipe of claim 5 wherein said body further comprises a third side portion extending from and being disposed perpendicular to said second side portion; and wherein said third side portion has a third interior surface having a third surface roughness less than the second surface roughness.

7. The light pipe of claim 6 wherein said body is a unitary component made from a single piece of material.

8. An EV charging handle comprising:
    a housing having a thru hole;
    a light source coupled to said housing; and
    a light pipe comprising:
        a body coupled to said light source in order to transmit light from said light source through the thru hole of said housing, said body comprising:
            a first side portion having a first interior surface having a first surface roughness, and
            a second side portion extending from said first side portion, said second side portion having a second interior surface having a second surface roughness greater than the first surface roughness in order to increase a visibility range with which the light is transmitted through the thru hole of said housing.

9. The EV charging handle of claim 8 wherein said housing has an edge portion defining the thru hole; wherein said light pipe generally extends from said light source to the edge portion; and wherein said light pipe is disposed internal with respect to said housing.

10. The EV charging handle of claim 8 wherein a reflection of the light off of the first interior surface is specular reflection; and wherein a reflection of the light off of the second interior surface is diffuse reflection.

11. The EV charging handle of claim 10 wherein the first interior surface and the second interior surface each have a centrally disposed plane and a plurality of peak portions each spaced a distance from the centrally disposed plane; wherein the average of the distances of the peak portions from the centrally disposed plane of the first interior surface is less than 0.8 micrometers; and wherein the average of the distances of the peak portions from the centrally disposed plane of the second interior surface is greater than 0.8 micrometers.

12. The EV charging handle of claim 8 wherein the second surface roughness is greater than the first surface roughness in order to increase the visibility range with which the light is transmitted through the thru hole of said housing when the light is viewed from a relative observation point external said housing.

13. The EV charging handle of claim 8 wherein the second side portion is disposed perpendicular to the first side portion.

14. The EV charging handle of claim 13 wherein said body further comprises a third side portion extending from and being disposed perpendicular to said second side portion; and wherein said third side portion has a third interior surface having a third surface roughness less than the second surface roughness.

15. The EV charging handle of claim 14 wherein said body is a unitary component made from a single piece of material.

* * * * *